April 12, 1949.  A. F. ECKEL  2,466,883
CALCULATOR AND DECIMAL POINT LOCATOR
Filed Feb. 16, 1945  2 Sheets-Sheet 1
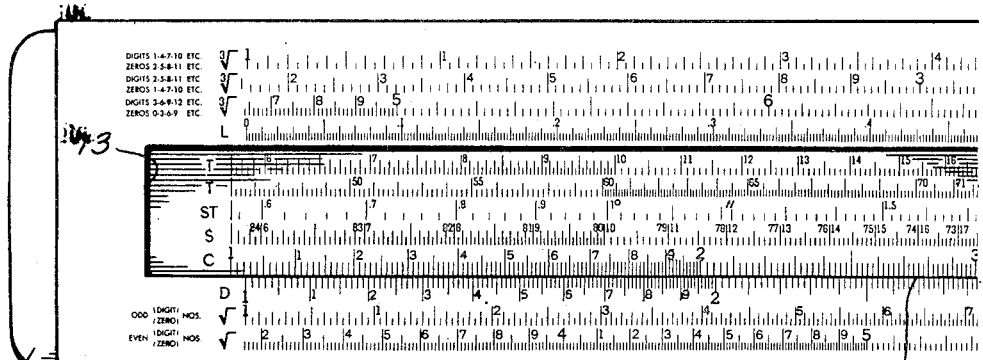
Fig. 1.
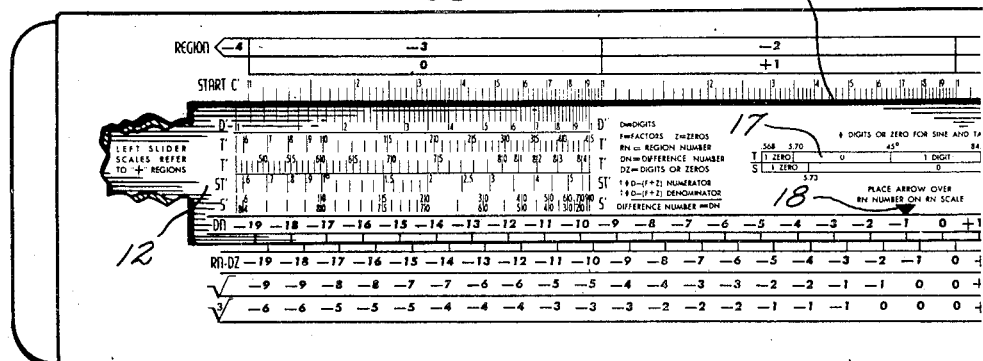
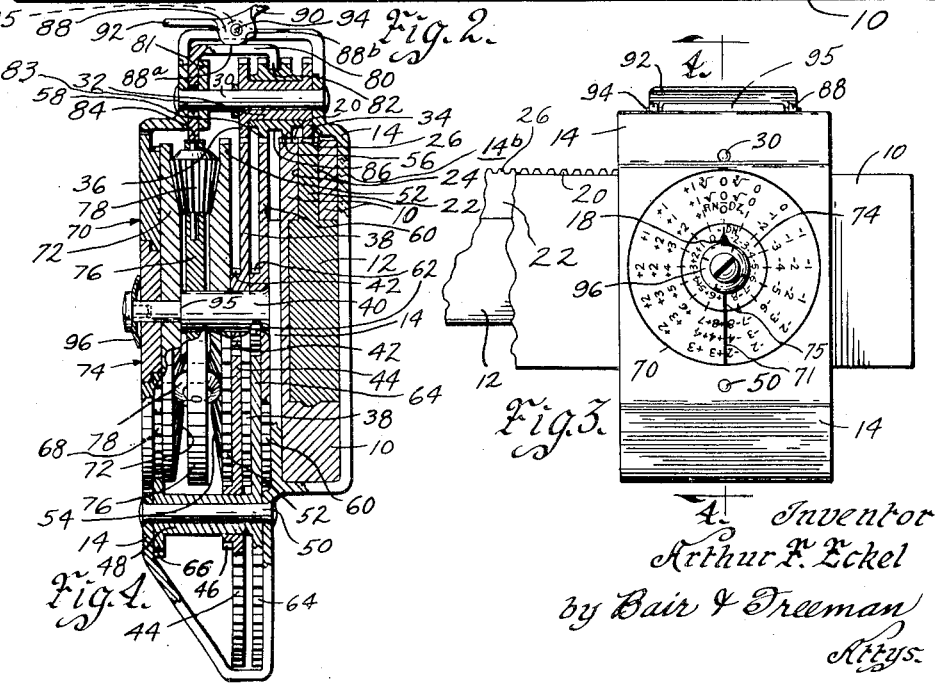
Fig. 2.
Fig. 3.
Fig. 4.
Inventor
Arthur F. Eckel
by Bair & Freeman
Attys.

April 12, 1949. A. F. ECKEL 2,466,883
CALCULATOR AND DECIMAL POINT LOCATOR
Filed Feb. 16. 1945 2 Sheets-Sheet 2
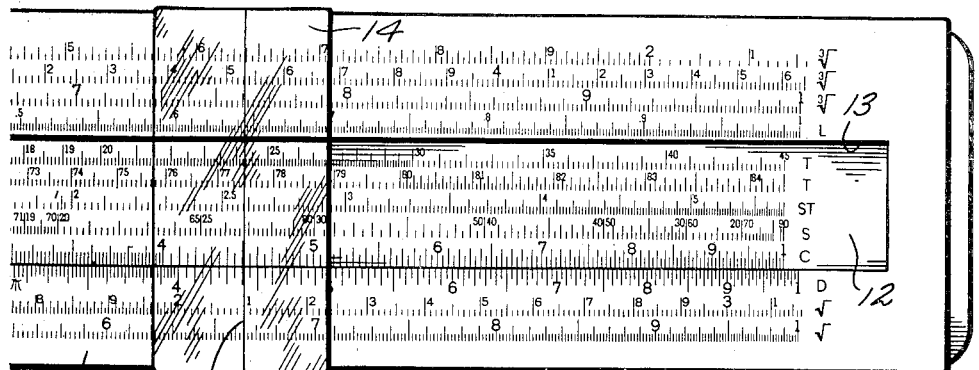
Fig.1A.
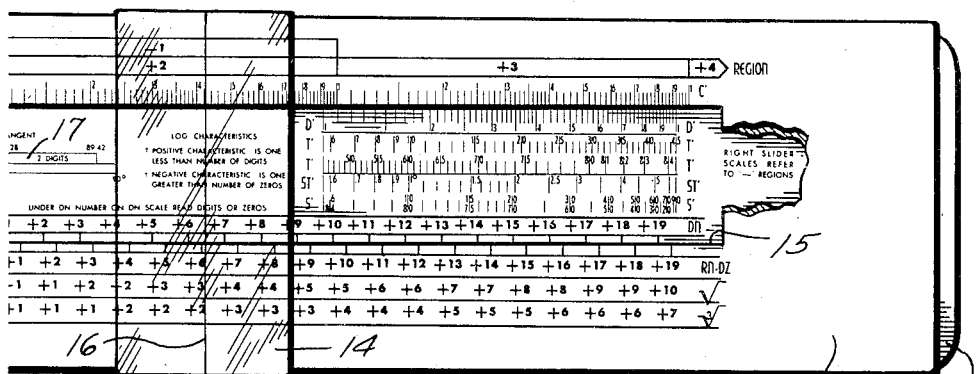
Fig.2A.
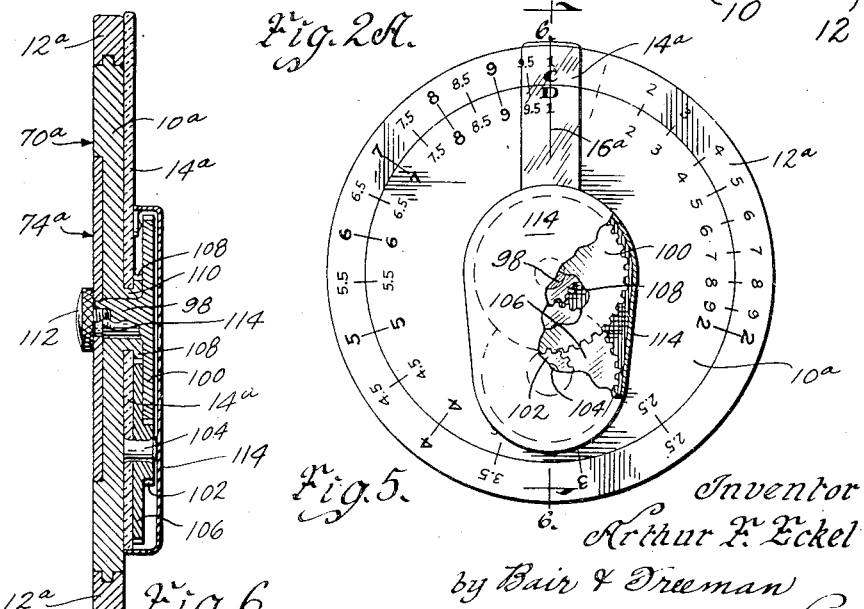
Fig.5.
Fig.6.
Inventor
Arthur F. Eckel
by Bair & Freeman
Attys.

Patented Apr. 12, 1949

2,466,883

UNITED STATES PATENT OFFICE 2,466,883

CALCULATOR AND DECIMAL POINT LOCATOR

Arthur F. Eckel, Chicago, Ill., assignor to Myrtle Scott Eckel, Chicago, and Louise Wickersham Pickett, La Grange, Ill.

Application February 16, 1945, Serial No. 578,157

15 Claims. (Cl. 235—64.3)

This invention relates to a calculator of the "slide rule" variety and a decimal point locator associated therewith whereby the decimal point in a calculation can be determined in one form of the invention by manual operations and calculations, and in another form of the invention a decimal point dial is automatically operated in response to movements of the slider and rider of the slide rule during the course of a calculation to thereby assist in determining the decimal point.

This application is a continuation-in-part of my copending application, Serial No. 451,449, filed July 18, 1942, now abandoned.

One object of my invention is to provide a decimal point locator which may be conveniently arranged on the back of a slide rule and which is provided with indicia arranged to assist in indicating the decimal point location in the answer to a problem in response to the calculation of such problem on a reduced scale version of the slide rule printed on the back thereof in a plurality of sections to indicate directly any answer that goes "off scale."

Another object is to simplify the determination of the decimal point in the answer so that calculation, according to a simplified formula involving the number of factors, digits and zeros in the calculation, will indicate a Difference Number, which Difference Number can then be utilized for the purpose of registry with a certain Region Number, the Region Number being found by the number of times the answer goes off scale, as determined by manipulations of the reduced plurality of slide rule scales on the back of the slide rule.

Another object is to provide certain scales for a Difference Number and a Region Number which cooperate with each other to indicate the position of the decimal point in numbers of the first, one-half and one-third powers of the numbers. These scales may be extended on to additional powers of the numbers in an obvious manner.

A further object is to provide one form of the invention wherein the Region Number is automatically determined by mounting the Region Number scale and a dial on the rider of the slide rule, the dial being rotated through a gearing arrangement from racks on the stator and slide of the slide rule with which certain pinions of the gearing mechanism cooperate, thereby operating the dial in response to movement of either the slide or the rider in relation to the stator.

Still a further object is to provide a Difference Number scale on the dial and utilize the Region Number scale also for reading digits and zeros in the answer, the Region Number scale being thereby a combined Region Number and Digits-Zero scale on which the Digits and Zeros in the answer can be read.

An additional object is to provide an automatic Region Number, Difference Number and Digits-Zero indicator which is readily applicable to a rotary slide rule.

With these and other objects in view, my invention consists in the construction, arrangement and combination of the various parts of my decimal point locator and its relation to a slide rule whereby the objects contemplated are attained, as hereinafter more fully set forth, pointed out in the claims and illustrated in the accompanying drawings, wherein:

Fig. 1 is an enlarged front elevation of a slide rule embodying my invention showing the left half of the rule;

Fig. 1A is a similar view showing the right half of the rule;

Fig. 2 is a similar view showing the left half of the back of the rule on which the decimal locator is mounted;

Fig. 2A is a similar view of the right half of the back of the rule;

Fig. 3 is an elevation of a special type of rider having the decimal point locator mounted thereon and geared to the stator and slide of the slide rule;

Fig. 4 is an enlarged sectional view on the line 4—4 of Fig. 3 showing the gearing arrangement and associated parts;

Fig. 5 is a sectional view of a rotary slide rule to which the invention has been applied; and Fig. 6 is an enlarged sectional view on the line 6—6 of Fig. 5.

On the accompanying drawings I have used the reference numeral 10 to indicate the stator of my slide rule; 12 the slide thereof; and 14 the rider. The rider 14 is transparent and has the usual hairline 16 thereon for indicating purposes.

Referring to the front of the slide rule, as shown in Figs. 1 and 1A, there is a succession of scales from top to bottom thereof. The first four scales are on the stator, three of them being cube root scales indicated $\sqrt[3]{}$. These may be referred to as the upper, middle and lower cube root scales without the necessity of applying reference numerals to them. The fourth scale is a log scale, indicated as L, and its purpose will be referred to hereinafter.

The next five scales are on the slide and appear through a sight opening 18 of the stator 10. These five scales may be classified as follows: Upper T scale (indicated T) is the tangent scale of angles between 5.7° and 45°. The lower T scale (also indicated T) is used on angles between 45° and 84.3°. The third scale on the slide (ST) is for sines and tangents of small angles, as will be hereinafter explained. The fourth scale (S) is for sines of angles between 5.73° and 90°. The fifth scale is the regular C scale of an ordinary slide rule used in multiplication and division computations.

The next scale (D) is the ordinary D scale on the stator of the slide rule used in multiplication and division computations. Below the D scale are an upper square root scale ($\sqrt{\ }$) and a lower square root scale (also indicated $\sqrt{\ }$). These will be hereinafter referred to as the upper $\sqrt{\ }$ scale and the lower $\sqrt{\ }$ scale.

In Figs. 2 and 2A the back of the slide rule is shown. The back is a combined rough result calculator and decimal point locator, and has the C, D, T, T, ST and S scales of the front of the rule also printed thereon and designated, respectively, C′, D′, T′, T′, ST′ and S′. The C′ scale is arranged on the stator 10 in this instance, and the D′ scale on the slide 12. The D′, T′, T′, ST′ and S′ scales appear through a sight opening 15 in the stator 10, portions of the stator adjacent the ends of the opening being broken away to show instructional data on the slide 12.

The C′ scale is condensed in length with respect to the C scale on the front of the slide rule, and is repeated four times. The D′, T′, T′, ST′ and S′ scales are repeated twice on the slide, once at the left for multiplication and once at the right for division.

On the stator 10 above the C′ scales are two "Region" scales (see Figs. 2 and 2A). Reading from right to left, the upper region scale has a −1, a −2, a −3 and part of a −4 region indicated. Reading from left to right, the lower region scale has a 0 region, a +1 region, a +2 region, a +3 region and part of a +4 region indicated. These regions are substantially coextensive with the repeated C′ scales.

In determining region numbers the left hand stator scale C′ is considered "on-scale" with a region number of 0. The three stator scales C′ to the right of the left hand scale are considered "off scale to the right" regions and are designated respectively +1, +2 and +3. This is particularly for problems in multiplication.

In division, readings extend "off scale to the left." The right hand C′ scale of the stator is considered "on-scale" with a region number of 0 again and the three stator scales to the left of the right hand one are considered as "off scale to the left" regions −1, −2 and −3. If any problem extends beyond the length of four stator scales, higher plus and lower minus region numbers are used but have to be kept track of.

On the slide 12, and appearing through the sight opening 15, is a Difference Number scale indicated DN. This scale at the center has a 0 with minus numbers to the left of the 0 and plus numbers to the right of the 0. A black arrow, indicated at 18 in Fig. 2, is placed over the −1. Several other notations are preferably provided on the slide 12, as shown in the drawing for convenience in indicating the operation of the decimal point locator to the user, but will not be referred to in detail.

On the stator 10 below the scale DN of the slide there is a scale indicated as RN-DZ. This is the Region Number-Digit-Zero scale, and below it are further RN-DZ scales for square root ($\sqrt{\ }$) and cube root ( ).

The foregoing description is somewhat brief and does not explain the purpose of the various scales and arrangements. Their purpose is believed best explained by first explaining the theory of decimal point location with a few problems in both multiplication and division and a process of algebraic substraction on the back of the slide rule followed by an explanation of the use of special scales for square roots and squares, cube roots and cubes, logarithms, trigonometry, and computations involving several scales. I shall then go into the theory of the decimal point locator and the formula which I use as a basis for its operation.

DECIMAL POINT LOCATION

LOCATING THE DECIMAL POINT IN MULTIPLICATION

Although in simple problems the position of the decimal point can be estimated, there are many problems in which this part of the work is more difficult. There are several ways of simplifying the work. The method described below makes use of the decimal point locator already described on the back of the slide rule.

When numbers are greater than 1 the number of digits to the left of the decimal point will be counted. Thus 734.05 will be said to have 3 digits. Although as written the number indicates accuracy to five digits, only three of these are at the left of the decimal point.

Numbers that are less than 1 may be written as decimal fractions. Only positive real numbers are being considered in this discussion. Thus .673, or six-hundred-seventy-three thousandths, is a decimal fraction. Another example is .000465. In this number three zeros are written to show where the decimal point is located. One way to describe such a number is to tell how many zeros are written to the right of the decimal point before the first non-zero digit occurs.

In scientific work a zero is often written to the left of the decimal point, as in 0.00541. This shows that the number in the units' place is definitely 0, and that no digits have been carelessly omitted in writing or printing. The zeros will not be counted unless than are (a) at the right of the decimal point, (b) before or at the left of the first non-zero digit, and (c) are not between other digits. The number 0.000408 will be said to have 3 zeros (that is, the number of zeros between the decimal point and the 4).

*Examples*

| Number | Number of digits to be counted | Number of zeros to be counted |
|---|---|---|
| 64523. | 5 | 0 |
| 802.7 | 3 | 0 |
| 0.00457 | 0 | 2 |
| 3.05 | 1 | 0 |
| .00206 | 0 | 2 |
| 65.023 | 2 | 0 |
| .00006 | 0 | 4 |

The example which follows shows how the decimal point locator is used.

*Example.*—Multiply 3420000×.000694.

Ignoring the decimal points for the moment, multiply 342×694, obtaining 237. Now repeat the multiplication using the C′ scale and D′ scale on the back of the rule near the upper left-hand corner. Using the hairline 16 as a guide, the result read on the C′ scale is about 24, which provides a rough check of the result. In the space just above the C' scale the hairline falls within a region marked +1. This is the "Region Number" for this multiplication. The settings may be made very quickly and roughly, since only a check and the "Region Number" are desired.

Note that there are two D' scales on the slide—one at the left end and one at the right end. The left-hand D' scale is used for multiplication, starting at the left and reading toward the right. The region number is read on the bottom region number scale (just above the C' scale), as 0, or +1, or +2, etc.

Set the lower point of the arrow 18 above the "Region Number" on the RN-DZ scale. In this example, the arrow is set above +1.

Now in the example 3420000×.000694, the number 3,420,000 has seven digits. The number .000,694 has 3 zeros. The product of 2 numbers or factors is to be found. The sum of the number of zeros (3) and the number of factors (2) is 5. This 5 subtracted from the number of digits (7) leaves +2. Now locate +2 on the DN scale, and below it read +4 on the RN-DZ scale. This +4 means that the product has 4 digits, and hence the result is approximately 2370.

Although it is difficult to describe this process briefly, with a little practice results can be obtained very quickly by the following rules.

*Step 1.*—Use rough settings of the numbers on the C' and D' scales to find the Region Number in the region above the answer on the C' scale. The slide 12 projects to the right, and the Region Number is in the lower or (+) regions. In a very few computations of continued products it may happen that the Region Number is larger than +3. When this occurs the left-hand D' scale extends beyond the rule at the right end. By use of the hairline, the last product obtainable on the rule should be moved to the left-hand C' scale. The multiplication is then continued, but +3 must be added to the Region Number found. Thus the Region Number for 9×9×9×9×9×9, or $9^6$, is (+2 +3), or +5. Similarly, another +3 would be added if the result falls off the rule a second time, etc. Thus the Region Number for $9^9$ is +8.

*Step 2.*—Set the point of the arrow 18 over the Region Number on the RN-DZ scale.

*Step 3.*—Count the number of factors to be multiplied and the number of their zeros (if any), and subtract the total from the number of digits. Locate this result on the DN scale, and read the number below it on the RN-DZ scale.

If this number has a + sign, it is the number of digits in the product.

If this number has a − sign, as −1, −2, −3, it means that the product has zeros to the right of the decimal point, and the numerical value, as 1, 2, 3, tells how many of these zeros there are.

If this number is zero, the decimal point is to the left of the product. (That is, the product has no digits and no zeros.)

*Step 4.*—"Point off" the decimal place in the result.

*Example.*—43.×0.0000306×0.28.

First ignore the decimal points and multiply 43×306×28 on the C and D scales. The first three figures of the result are 368. Next, repeat the multiplication on the C' and D' scales as a check and as a means of finding the Region Number (+1). Set the arrow 18 over +1 on the RN-DZ scale. Now count the number of factors (3) and the number of zeroes (4) in the problem. The sum (7) when subtracted from the number of digits (2) leaves −5. Below −5 on the DN scale locate −3 on the RN-DZ scale. Therefore the result has 3 zeros to the right of the decimal point. The result, then, is .000368, approximately.

LOCATING THE DECIMAL POINT IN DIVISION

In locating the decimal point of the result after a division, an additional process is necessary in Step 3 above. It will usually be best to write the computation in the form of a fraction as in the example below. Then Step 3 above is done for both the numerator (dividend) and the denominator (divisor) of the fraction. In each case either a positive or a negative number is obtained. Finally, the number obtained for the denominator must be subtracted algebraically from the number obtained for the numerator. This result will be called the Difference Number or DN, and it may be located on the DN scale. Thereafter the steps are the same as before. Start the division on the left-hand D' and C' scales. The Region Number is read above the left index of a D' scale. If the quotient falls on the C' scale, the Region Number is zero. If the quotient falls off the C' scale (to the left), it and the Region Number may be read above the left index of the D' scale at the right end of the slide.

For combined multiplication and division, a more general rule is needed. If the left-hand D' scale can be used in reading the result, the Region Number is read in one of the lower Regions as 0, or 1, or 2, etc. At the left end on the back of the slide 12 a notation, Left Slider Scales Refer to "+" Regions, serves as a reminder of this fact (Fig. 2).

If the right-hand D' scale must be used in reading the result, the Region Number is read from the upper or (−) Regions as −1, or −2, or −3, etc. At the right end of the slide there is a reminder of this fact (Fig. 2A).

*Example.*—Divide .0035×726 by 9200×.0000064.

Step 1: Form the fraction $$\frac{.0035 \times 726}{9200 \times .0000064}$$

Step 2: Using the C and D scales, compute $$\frac{35 \times 726}{92 \times 64}$$

The first three figures of the result are 432.

Step 3: Repeat, using the C' scale and the D' scale at the left end of the rule. The Region Number RN is found to be −1. The quotient figures 43 may be readily checked by a glance at the C' scale.

Step 4: (*a*) Count the number of factors (2) and the number of zeros (2) in the numerator of the original fraction. When the total (4) is subtracted from the number of digits (3), the result is −1; that is, 3−4=−1. (*b*) Count the number of factors (2) and the number of zeros (5) in the denominator. When the total (7) is subtracted algebraically from the number of digits (4), the result is −3; that is, 4−7=−3. (*c*) Subtract the result for the denominator from the result for the numerator; i. e., −1−(−3)=+2. That is, subtract algebraically:

$$\begin{array}{r}-1\\-3\\\hline+2\end{array}$$

This +2 is the Difference Number, DN.

Steps 4a, 4b and 4c can be concisely stated numerically thus:

$$3 - 4 = -1$$
$$4 - 7 = -3$$
(subtracting)
$$\overline{\phantom{xxxx}+2}$$

Step 5: Set the arrow 18 over the Region Number (−1) on the RN scale. Locate the Difference Number (+2) on the DN scale. Read the number of digits (+2) on the DZ scale.

Step 6: Place the decimal point so that the product (see Step 2) has two digits; the product is 43.2.

ALGEBRAIC SUBTRACTION ON THE BACK OF THE SLIDE RULE

Some of the subtractions required in Step 4 above involve the use of negative numbers, such as −1, −2, −3, −4, etc. Students who are familiar with these numbers will have no difficulty, but it is a good idea to jot down the numbers as above, following Step 4. (If a number has no + or − sign before it, a + sign may be put there without changing the numerical value.)

On my slide rule these subtractions can be done (or checked) mechanically. The DN and RN scales are used. The method is as follows:

*Rule.*—Locate the number to be subtracted on the DN scale, and set it over the number it is to be subtracted from, located on the RN scale. Read the result on the RN scale under the 0 of the DN scale.

*Examples*

(a) 4−6=? or subtract $$\begin{array}{r}4\\6\\\hline\end{array}$$

Locate +6 on the DN scale (use indicator), and set it over +4 on the RN scale. Under 0 of the DN scale find the result, −2.

(b) −3−5=? or subtract $$\begin{array}{r}-3\\5\\\hline\end{array}$$

Locate 5 on the DN scale, and set it over −3 of the RN scale. Under 0 of the DN scale find the result, −8.

(c) −1−(−2)=? or subtract $$\begin{array}{r}-1\\-2\\\hline\end{array}$$

Locate −2 on the DN scale, and set it over −1 of the RN scale. Under 0 of the DN scale find the result, +1.

(d) 7−(−5)=? or subtract $$\begin{array}{r}7\\-5\\\hline\end{array}$$

Locate −5 on the DN scale, and set it over +7 of the RN scale. Under 0 of the DN scale find the result, +12.

USE OF SPECIAL SCALES

SQUARE ROOTS AND SQUARES

When a number is multiplied by itself the result is called the square of the number. Thus 25 or 5×5 is the square of 5. The factor 5 is called the square root of 25. Similarly, since 12.25=3.5×3.5, the number 12.25 is called the square of 3.5; also 3.5 is called the square root of 12.25. Squares and square roots are easily found on a slide rule.

*Square root.*—Just below the D scale is another scale marked with the square root symbol, $\sqrt{\phantom{x}}$.

*Rule.*—The square root of any number located on the D scale is found directly below it on the $\sqrt{\phantom{x}}$ scale.

*Examples.*—Find $\sqrt{4}$. Place the hairline of the indicator over 4 on the D scale. The square root, 2, is read directly below. Similarly, the square root of 9 (or $\sqrt{9}$), is 3, found on the $\sqrt{\phantom{x}}$ scale directly below the 9 on the D scale.

*Reading the scales.*—The square root scale directly below the D scale is an enlargement of the D scale itself. The D scale has been "stretched" to double its former length. Because of this the square root scale seems to be cut off or to end with the square root of 10, which is about 3.16. To find the square root of numbers greater than 10 the bottom $\sqrt{\phantom{x}}$ scale is used. This is really the rest of the stretched D scale. The small figure 2 near the left end is placed beside the mark for 3.2, and the number 4 is found nearly two inches farther to the right. In fact, if 16 is located on the D scale, the square root of 16, or 4, is directly below it on the bottom scale of the rule.

In general, the square root of a number between 1 and 10 is found on the upper square root scale. The square root of a number between 10 and 100 is found on the lower square root scale. If the number has an odd number of digits or zeros (1, 3, 5, 7, . . .) the upper $\sqrt{\phantom{x}}$ scale is used. If the number has an even number of digits or zeros (2, 4, 6, 8, . . .), the lower $\sqrt{\phantom{x}}$ scale is used.

On the slide rule, the first three (or in some cases even four) figures of a number may be set on the D scale, and the first three (or four) figures of the square root are read directly from the proper square root scale.

On the back and near the bottom of the rule is a scale (marked $\sqrt{\phantom{x}}$) useful in finding the number of digits (or zeros) in a square root. Locate the number of digits on the RN scale. Read the number of digits in the square root on the scale marked $\sqrt{\phantom{x}}$ just below. The negative or "minus" signs indicate zeros in the number or in the square root.

*Examples*

(a) Find $\sqrt{248}$. Set the hairline on 248 of the D scale. This number has 3 (an odd number) digits. Therefore the figures in the square root are read from the upper $\sqrt{\phantom{x}}$ scale as 1575. Under the +3 of the RN scale we find +2 of the $\sqrt{\phantom{x}}$ scale. Hence the result has 2 digits, and is 15.75 approximately.

(b) Find $\sqrt{563000}$. Set the hairline on 563 of the D scale. The number has 6 (an even number) digits. Read the figures of the square root on the bottom $\sqrt{\phantom{x}}$ scale as 75. Under +6 of the RN scale find +3 on the $\sqrt{\phantom{x}}$ scale. The square root has 3 digits and is 750 approximately.

(c) Find $\sqrt{.00001362}$. Set the hairline on 1362 of the D scale. The number of zeros is 4 (an even number). Read the figures 369 on the bottom $\sqrt{\phantom{x}}$ scale. Locate −4 on the RN scale. Find −2 under it on the $\sqrt{\phantom{x}}$ scale. The result, then, has 2 zeros, and is .00369.

Squaring is the opposite of finding the square root. Locate the number on the proper bottom scale (marked $\sqrt{\phantom{x}}$) and with the aid of the hairline read the square on the D scale.

*Examples*

(a) Find $(1.73)^2$ or 1.73×1.73. Locate 1.73 on the upper $\sqrt{\phantom{x}}$ scale. On the D scale find the approximate square 3.

(b) Find $(62800)^2$. Locate 628 on the bottom $\sqrt{}$ scale. Find 394 above it on the D scale. The number has 5 digits. Locate +5 on the $\sqrt{}$ scale on the back of the rule. There are two +5's and above them on the RN scale we find +9 and +10. Hence the square has either 9 or 10 digits. Since, however, 628 was located on the bottom $\sqrt{}$ scale, the square has the even number of digits, or 10. The result is 3,940,000,000.

(c) Find $(.000254)^2$. On the D scale read 645 above the 254 of the upper $\sqrt{}$ scale. The number has 3 zeros. On the back of the rule locate the two −3's on the $\sqrt{}$ scale. Above them find −6 and −7. Since 254 was located on the scale for "odd zero" numbers, the result has 7 zeros, and is .0000000645.

Cube Roots and Cubes

At the top of the slide rule on the front (Figs. 1 and 1A) there is a cube root scale marked $\sqrt[3]{}$. It is a D scale which has been stretched to three times its former length, and then cut into three parts which are printed one below the other.

*Rule.*—The cube root of any number on the D scale is found directly above it on the $\sqrt[3]{}$ scales.

At the left end of the cube root scales a small table serves as a guide as to which scale to use. Also, on the bottom of the back of the rule is a $\sqrt[3]{}$ scale for determining the number of digits or zeros. It is used in exactly the same way as the $\sqrt{}$ scale above it was used.

Examples (a) Find $\sqrt[3]{8}$. Set the hairline 16 over the 8 of the D scale. On the topmost scale of the rule read 2 under the hairline.

(b) Find $\sqrt[3]{27}$. Set the hairline over 27 of the the D scale. On the middle $\sqrt[3]{}$ scale, find 3 under the hairline.

(c) Find $\sqrt[3]{372}$. Set the hairline over 372 of the D scale. On the bottom $\sqrt[3]{}$ scale find 719, or 7.19.

Cubing is the opposite of finding the cube root.

*Rule.*—The cube of any number located on the $\sqrt[3]{}$ scale is found directly below it on the D scale.

*Example.*—(a) Find $(32.8)^3$. Locate 32.8 on the middle $\sqrt[3]{}$ scale. On the D scale read directly below it the figures of the cube 353. Since 32.8 is a two digit number, a glance at the +2 of the $\sqrt[3]{}$ scale on the back of the rule shows that it falls under +4, +5, or +6 of the RN scale. But since 328 is found on the middle $\sqrt[3]{}$ scale, the number of digits is 5. The result is 35300 approximately.

Logarithms

The L scale on the front of the stator 10 just above the slide 12 is used for finding the logarithm (to the base 10) of any number.

*Rule.*—Locate the number on the D scale, and read the mantissa of its logarithm (to base 10) directly above it on the L scale.

*Example.*—Find log 425. Set the hairline over 425 on the D scale. Read the mantissa of the logarithm (.628) on the L scale. Since the number 425 has three digits, the characteristic is 2 and the logarithm is 2.628. As an aid to the memory, the rule for finding the characteristic is printed on the back of the slide 12.

If the logarithm of a number is known, the number itself may be found by reversing the above process.

*Example.*—If log $x=3.248$, find $x$. Set the hairline over 248 of the L scale. Below it read the number 177 on the D scale. Then $x=1770$ approximately.

*Example.*—Find log .000627. Opposite 627 on the D scale find .797 on the L scale. Since the number has 3 zeros, the characteristic is −4, and the logarithm is usually written 6.797−10, or 0.797−4.

Trigonometry

Sines and cosines

The scale S on the front of the slide 12 is used in finding the approximate sine or cosine of any angle between 5.73° and 90°. Since sin $x=\cos(90-x)$, the same graduations serve for both sines and cosines. Thus sin 6°=cos (90−6)°=cos 84°. The numbers at the right of the longer graduations are read when sines are to be found. Those at the left are used when cosines are to be found. Angles are divided decimally instead of into minutes and seconds. Thus sin 12.7° is represented by the 7th small graduation to the right of the graduation marked 78|12.

*Rule.*—To find the sine or cosine of an angle on the S scale, set the hairline 16 on the graduation which represents the angle. Read the sine on the C scale under the hairline. If the slide is placed so the C and D scales are exactly together, the mantissa of the logarithm of the sine (log sin) may also be read on the L scale.

Examples (a) Find sin $x$ and also log sin $x$ when $x=15°\ 30'$. Set left index of C scale over left index of D scale. Set hairline on 15.5° (i. e., 15° 30'). Read sin $x=.267$ on the C scale. Read .427 on the L scale. Then the log sin $x=9.427-10$.

(b) Find cos $x$ and log cos $x$ when $x=42°\ 15'$ (or $x=42.25°$). Observe that the cosine scale decreases from left to right, or increases from right to left. Set the hairline over 42.25 on the S scale (reading from the right). Find cos $42.25=.740$ on C scale. Find .869 on L scale. Hence log cos 42° 15'=9.869−10.

Tangents

The upper T scale on the front of the slide 12 is used to find tangents of angles between 5.70° and 45°. These tangent ratios are all between 0.1 and 1; that is, the decimal point is at the left of the number as read from the scale. The lower T scale is used in finding tangents of angles between 45° and 84.3°. These tangents are between 1 and 10; that is, they all have one digit to the left of the decimal point.

*Rule.*—Set the angle value on the graduation which represents the angle and read the tangent on the C scale. If the C and D scales have their indices exactly together, the mantissa of the logarithm of the tangent may also be read on the L scale.

Examples (a) Find tan $x$ and log tan $x$ when $x=9°\ 50'$. First note that $$50'=\frac{50}{60}$$

of 1 degree=.83°, approximately. Hence $$9°\ 51'=9.83°$$

Set the left index of the C scale and of the D scale opposite each other. Locate $x=9.83°$ on the upper T scale. Read tan $x=.173$ on the C scale, and read .239 on the L scale. Then log tan $x=9.239-10$.

(b) Find tan $x$ when $x=68.6°$. Use the lower T scale. Read 255 on the C scale. Since all angles on the lower T scale have tangents greater than 1

(that is, have one digit as defined above), tan $x=2.55$.

Sines and tangents of small angles

The sine and the tangent of angles of less than about 5.7° are so nearly equal that a single scale on the front of the slide 12, marked ST, may be used for both. The graduation for 1° is marked with the degree symbol (°). To the left of it the primary graduations represent tenths of a degree. The graduation for 2° is just above the graduation for 35 on the C scale. The graduations for 1.5° and 2.5° are also numbered.

A small scale 17 on the back of the rule at the center of the slide 12 shows the number of zeros in the sine of angles between 0 and 90°, and the number of zeros or digits in the tangents of most of these angles. Sines or tangents of angles on the ST scale have one zero. Sines (or cosines) of all angles on the S scale have no digits or zeros—the decimal point is at the left of figures read from the C (or D) scale. All angles located on the upper T scale also have the decimal point of the tangents at the left of the numbers. Angles located on the lower T scale have one digit in their tangents. Tangents of angles larger than 84.3° are not read from the rule; they increase rapidly and have at least two digits.

Two seldom used special graduations are also placed on the ST scale. One is marked with the symbol for minutes (') of angle, and is found just to the left of the graduation for 2°. When this graduation is set opposite any number of minutes on the D scale, the sine (or the tangent) of an angle of that many minutes may be read on the D scale under the C index.

Sine 0°=0, and sin 1'=.00029, and for small angles the sine increases by .00029 for each increase of 1' in the angle. Thus sin 2'=.00058; sin 3.44'=.00100, and the sines of all angles between 3.44' and 34.4' have two zeros. Sines of angles between 34.4' and 344' (or 5.73°) have one zero. The tangents of these small angles are very nearly equal to the sines.

*Example.*—Find sin 6'. With the hairline set the "minute graduation" (') opposite 6 located on the D scale. Read 175 on the D scale under the C index. Then sin 6'=.00175.

The second special graduation is marked with the symbol for the seconds of angle (") and is located near the graduation for 1.2°. It is used in exactly the same way as the graduation for minutes. Sin 1"=.0000048 approximately, and the sine increases by this amount for each increase of 1" in the angle, reaching .00029 for sin 60" or sin 1'.

COMPUTATIONS INVOLVING SEVERAL SCALES

Many calculations are simplified by using several different scales. Suppose it is necessary to compute the areas of many circles. Since the formula $A=\pi r^2$ can be written as a proportion, that is, $$\frac{1}{\pi}=\frac{r^2}{A'}$$

the following rule will hold. Set $\pi$ of the C scale opposite the index of the D scale. Locate the hairline over the value of the radius $r$ on the $\sqrt{}$ scale. Read the area under the hairline on the C scale. If the diameters are known, instead of the radii, then $$A=\frac{\pi d^2}{4}$$

or $A=.7854d^2$. Hence set .785 on the C scale opposite the index (usually right-hand) of the D scale. Locate the hairline over the value of the diameter on the $\sqrt{}$ scale, and read the area under the hairline on the C scale. In similar fashion, but using the cube root scales, the volume of spheres may readily be found.

Many formulas involve both trigonometric ratios and other factors. By using several different scales such computations are easily done.

*Example.*—Find the length of the legs of a right triangle in which the hypotenuse is 48.3 ft. and one acute angle is 25° 20'.

The side opposite the given acute angle is equal to 48.3 sin 25° 20'. Hence we compute $48.3 \times \sin 25.3°$. Set the index (right-hand index in this example) of the C scale on 48.3 of the D scale. Move the hairline over 25.3° on the S scale. Read 20.7 under the hairline on the D scale. Another method is to set the left index of the C scale and D scale opposite each other. Set the hairline over 25.3° on the S scale. Move the slide so that (right) index of the C scale is under the hairline. Read 20.7 on the D scale under 48.3 of the C scale. The length of the other leg is equal to 48.3 cos 25.3° or 48.3 sin 64.7°=43.7.

The decimal point in this result may be found by use of the special point-locator scales on the back of the rule. Set 48 on the left-hand C' scale, and locate the hairline over sin 25° on the small S' scale of the slide. The Region Number (RN) found under the hairline is +1. In this example $$DN=D-(F+Z)=2-(2+0)=0$$

when the arrow 18 is set over +1, the number under 0 is +2 on the DZ scale, showing that the result (20.7), has two digits.

Powers involving the fractional exponents 2/3 and 3/2, or in other words, combinations of squares of cube roots, and of cubes of square roots, may be done with one setting of the hairline.

Rule to compute $a^{2/3}$: Set $a$ on the $\sqrt{}$ scale. Read $a^{2/3}$ on the $\sqrt[3]{}$ scale.

Rule to compute $a^{3/2}$: Set $a$ on the $\sqrt[3]{}$ scale. Read $a^{3/2}$ on the $\sqrt{}$ scale.

*Example.*—Find the surface area of a cube which has a volume of 64 cu. in. Since $V=e^3$, then $e=\sqrt[3]{V}=V^{1/3}$. Also $S=6e^2$ or $S=6V^{2/3}$. If $V=64$, then $S=6\times 64^{2/3}$. To find $64^{2/3}$, set the hairline over 64 on the $\sqrt{}$ scale. Read on the $\sqrt[3]{}$ scale, $64^{2/3}=16$.

*Example*—A formula sometimes used in aeronautical computations is $$P_n=\left(\frac{Wn}{Wo}\right)^{3/2}P_o$$

It is used to help answer questions like the following: If the weight of a plane is increased 15%, what effect has this on the required horsepower $P_n$—

Solution: In this case $$\frac{Wn}{Wo}=1.15$$

Then $(1.15)^{3/2}$ must be computed. Set 1.15 on the $\sqrt[3]{}$ scale. Read 1.23 on the $\sqrt{}$ scale. Hence the horsepower must be increased by 23%.

*Example.*—In radio theory, the resonance frequency is given by the formula $$f=\frac{1}{2\pi\sqrt{LC}}$$

Find $f$ when $L=253$ microhenries and $C=90$ micro-micro farads. Then $$f = \frac{1}{2\pi\sqrt{.000,253 \times .000,000,000,090}}$$

For slide rule computation it is more convenient to write this in the equivalent form:

$$f = \sqrt{\frac{1}{4\pi^2 \times 0.000,253 \times .000,000,000,090}}$$

It is also best to calculate the position of the decimal point first.

Using the C′ and D′ scales, divide 1 by 4, the result by $\pi$, this by $\pi$ again, this result by 253, and finally this by 90. The RN is −3. A more detailed explanation of the method of obtaining this result follows. Under the leftmost index of the C′ scale set 4 on the left-hand D′ scale. Move the hairline over the left index of the right hand D′ scale. The Region Number for this part, read under the hairline, is −1. Move 3.1 (or $\pi$) on the D′ scale under the hairline, and then move the hairline to the left index. The new Region Number is −2. Continue in this way until all the remaining factors in the denominator (i. e., $\pi$, 253, and 90) have been used. The final RN=−3.

For the numerator $D-(F+Z)=0$. For the denominator $D-(F+Z)=3-(5+13)=-15$. Hence $DN=0-(-15)=15$. With the arrow 18 over $RN=-3$, note 13 on DZ under the DN(15). At the same time note 7 on the V scale below the 13. There are 13 digits in the number under the square root symbol, and 7 digits in the final answer.

Now repeat the calculations using the C and D scales. After the last division the square root of the result is found on the upper V scale on the front of the rule, since the number has 13 (an odd number) digits. The result is 1,060,000 and the frequency is about 1060 kilocycles.

*Example.*—In the study of meteorology it is sometimes desirable to compute $$a = \sqrt{\frac{pw \sin \phi}{u}}$$

where $p$=density of the air, $w$=angular velocity of the earth's rotation, $\phi$=latitude, and $u$=coefficient of eddy viscosity. Find $a$, when $p=0.0011$, $w=0.0000729$, $\phi=40°$, and $u=116$.

The ease with which such a calculation can be done on my slide rule is shown below. We have to compute:

$$\sqrt{\frac{0.0011 \times 0.0000729 \times \sin 40°}{116}}$$

For the numerator, $D-(F+Z)=0-(3+6)=-9$. For the denominator, $D-(F+Z)=3-(1+0)=2$. Difference Number, $DN,=-9-(+2)=-11$.

Using the compressed scales C′, D′, S′ at the left end of the decimal point locator on the back of the slide rule, find RN=+1. Set the arrow 18 over +1. On the DZ scale under −11 read −9. On the V scale under −11 read −4. Then the result has four zeros.

Next, set 116 on C scale over 11 on D scale, move runner to 729 on C scale. Move right index under the rider 14; then move the hairline 16 over sin 40 on S scale. The number under the square root symbol has 9 (an odd number) zeros. Hence read the result on the upper square root scale, as 211. Point off the decimal place in the result 0.0000211.

Other values, such as log $a$ could be read from the same setting but would not usually be found in the example: log $a=5.648-10$.

THEORY OF THE DECIMAL POINT LOCATOR

A brief discussion of the theory of the special features of my decimal point locator follows. A knowledge of the theory of logarithms is required for a complete understanding of how the decimal point locator achieves its results.

When multiplications are carried out by means of logarithms it frequently happens that the sum of two or more of the mantissas exceeds 1. In ordinary computation this results in a "carry number" which is added to the characteristic. In slide rule computation this situation corresponds to cases in which the slide extends too far to the right and the other index is used in order to read the result of a multiplication on the D scale. On my decimal point locator the Positive Regions above the small C′ and D′ scales represent "carry numbers" of +1, +2, etc., resulting from the accumulation of mantissas. The Negative Regions −1, −2, etc., represent the reduction ("borrowing") in value of the characteristic which occurs when, in division by logarithms, the mantissa subtracted exceeds the mantissa of the dividend or numerator.

*Examples*

(a) Multiply 36×7700.

By logarithms;    log 36=1.556
                log 77=3.886

Sum=5.442
                Answer=276000

Observe that the sum of the characteristics, 1+3=4, is increased by 1, the "carry number" from the mantissas. When the multiplication is done on the slide rule, the addition of the mantissa is accomplished by means of the adjacent scales. When the C′ and D′ scales are used, the Region Number (or "carry number") is seen to be +1.

(b) Divide 231÷68.

By logarithms    log 231=2.364
               log  68=1.833

Difference=0.531
               Answer=3.40

Observe that it is necessary to "borrow" 1 from from the 2 in the characteristic in order to subtract. When the division is done on the slide rule, the subtraction of the logarithms is accomplished by means of the adjacent scales. When the C′ and right hand D′ scales are used, the Region Number (or "amount borrowed") is indicated by −1. Thus the Regions are a convenient mechanical device for keeping track of the gain or loss in value of the characteristic as a result of carrying (or borrowing) in operating with the mantissas.

Consider now a calculation requiring the product of F factors; e. g., $A_1 \times A_2 \times A_3 \times \ldots A_F$. If $A_1$ contains any number of digits (including zero), let $d_1$ represent this number. In general, if $A_i$ contains any number of digits (including zero) let $d_i$ represent the number of these digits. Similarly, if $A_i$ contains any zeros let $z_i$ represent the number of these zeros. Suppose now that any contribution to the characteristic "carried" from the sum of the mantissas is ignored. Then the uncorrected characteristic of the product above is $$C = (d_j - 1) + (d_k - 1) + \ldots (d_l - 1) - (z_p + 1) - (z_q + 1) - \ldots (z_r + 1)$$

where the subscripts $j, k, l, p, q, r$, etc., represent integers of the set 1, 2, 3, ... F and are such that every integer of this set is represented once. Under these conditions when the parentheses in this sum are removed, $-1$ will occur F times and the sum of these terms will be $-F$. Then $$C = (d_j + d_x + \ldots d_1) - (z_p + z_q + \ldots z_r) - F$$

Represent the sum of the number of digits in the factors by D, and the sum of the number of zeros by Z. Then $$D = d_j + d_k + \ldots d_l$$

and $$Z = z_p + z_q + \ldots z_r$$

Then $C = D - (Z + F)$ which indicates that the uncorrected characteristic of the product of F factors may be found by subtracting the sum of the number of zeros and the number of factors from the number of digits.

When an expression to be computed has the form $$\frac{A_1 \times A_2 \times A_3 \times \ldots A_F}{B_1 \times B_2 \times B_3 \times \ldots B_{F'}}$$

the same rule may be used to calculate the characteristic $C'$ of the denominator. Then the characteristic of the quotient is, by the usual rules, $C - C'$. Since in general C and $C'$ may be positive, negative, or zero, algebraic subtraction must be used throughout. It must be remembered that the characteristic so computed must be corrected by the addition of numbers resulting from any "carrying" or "borrowing" in operating with the mantissas which affects the characteristic.

In the notation used on the back of the slide rule, the Difference $C - C' = DN$. When no division (except by 1) is called for, $C' = 0$, and the Difference Number is merely $D - (F + Z)$ calculated for the numerator. The correction to DN is made mechanically by setting the arrow 18 over the Region Number in the RN scale, and finding the number of digits (or zeros) in the result under the DN number on the DZ scale. This is, of course, merely simple algebraic addition by means of uniform (rather than logarithmic) scales.

If the arrow 18 had been placed over the 0 of the DN scale, the usual rules, such as "the number of digits in the result is one more than the characteristic" would have applied. The calculation of the "one more" in this rule is taken care of mechanically by placing the arrow 18 over $-1$ instead of 0. A similar sort of discussion applies to the case in which the result has zeros to the right of the decimal point.

An alternative rule useful in locating the decimal point in division may be derived as follows: Let subscripts $n$ and $d$ indicate the numerator and the denominator respectively. Then $$DN = C - C' = D_n - (F_n + Z_n) - [D_d - (F_d + Z_d)]$$
$$DN = (D_n - D_d) - [(F_n - F_d) + (Z_n - Z_d)]$$

According to this rule one may compute DN as follows:

(1) Count the number of digits in numerator and subtract the number of digits in the denominator.
(2) Repeat for factors.
(3) Repeat for zeros.
(4) Add the results of steps (2) and (3) and subtract the sum from the result of (1).

The four steps of the rule just described may be simplified into the following formula, taking into consideration that 1 is to be subtracted from the calculation of the digits, factors and zeros in the numerator and denominator to get an accurate answer:

$$DN = D_n - (F_n + Z_n) - [D_d - (F_d + Z_d)] - 1$$

With the arrow 18 placed over $-1$ on the DN scale of the slide, however, the $-1$ in the above formula can be omitted, thus producing the formula:

$$DN = D_n - (F_n + Z_n) - [D_d - (F_d + Z_d)]$$

to be used in connection with the calculation of the decimal point when using the decimal point locator illustrated on the back of the slide rule.

In order to eliminate the necessity of having to roughly perform the calculation on the back of the slide rule (which has already been performed accurately on the front of the slide rule to get the number in the answer), a structure as shown in Figs. 3 and 4 may be provided. The stator 10 has a rack 20 secured along one of its edges. The slide 12 has an extension 22 through a slot 24 of the stator which terminates along its edge in a rack 26. The rider 14 has a transparent part 14$^b$ through which the scale divisions for the C and D scales, etc., on the front of the rule can be seen, and this part of course would be provided with a hairline in the usual manner. A shaft 30 has its ends secured to the rider 14. Rotatable on the shaft 30 is a sleeve 32 having secured thereto a pair of pinions 34 and 36. The pinion 34 meshes with the rack 26, and a gear 38 meshes with the pinion 36.

The gear 38 is freely rotatable on a shaft 40 and has a pinion 42 integral therewith. The pinion 42 meshes with a gear 44 having a pinion 46 integral therewith, the gear and pinion element 44—46 being freely rotatable on a shaft 50 secured at its ends to the rider 14. The pinion 46 meshes with a gear 52 which has on one face thereof bevel gear teeth 54.

Meshing with the rack 20 is a pinion 56, and integral therewith is a second pinion 58. The pinions 56 and 58 rotate freely on the sleeve 32. A gear 60 is freely rotatable on the shaft 40 and has integral therewith a pinion 62 meshing with a gear 64. The gear 64 is secured to the sleeve 48 and also to the sleeve is secured a pinion 66. The pinion 66 meshes with a gear 68 on the face of which a dial 70 is printed. This dial is on the back side of the rider 14 opposite the hairline on the front of the rider.

Freely rotatable on the shaft 40 is a second bevel gear 72 opposite the bevel gear 54. The bevel gear 72 has frictionally engaged therewith a dial 74. A spring washer 96 of the cupped disk type effects such engagement, the bevel gear being backed by a shoulder 95 on the shaft 40. Freely rotatable on the shaft 40 between the bevel gears 54 and 72 is a disk 76 carrying, preferably, three bevel pinions 78 meshing with the bevel gears 54 and 72. The elements 54, 72 and 78 may be broadly termed as "differential gearing."

A lock is provided for the rider 14 in relation to the stator and for the disk 76 during certain operations of the slide rule. This lock consists of a lock plate 80 having flanges 82 and 84 frictionally coactible respectively with an annular groove 86 between the pinions 56 and 58 and the periphery of the disk 76. The lock plate is slidably mounted as between a guide flange 81 and an adjacent portion of the rider 14 and has a slot 83 to clear the pin 30. The lock plate 80 may be lowered to locked position by a pair of cams 88, as shown in Fig. 4, when one finger-piece 92 of the cams 88 is presesed toward the rider. The locks at 82 and 84 may be released from the groove 86 and the disk 76 by pressing a second finger-piece 90 of the cams 88. Each cam 88 has high and low flats 88$^a$ and 88$^b$ coacting with the lock plate 80 for this purpose. The cams are pivoted on a pivot pin 94 which is supported by a boss 95 on top of the rider 14.

The dial 74 has arranged thereon the DN scale shown in Figs. 2 and 2A, the arrangement, however, being in a circle instead of straight. This dial also has the arrow 18 applied thereto over the −1, as in the DN scale of Figs. 2 and 2A. The dial 70 has applied thereto the RN-DZ scales for the first power numbers, square root numbers ($\sqrt{\ }$) and cube root numbers $\sqrt[3]{\ }$ as on the stator 10 in Figs. 2 and 2A below the sight opening 15. The number of divisions in these scales determines the gear ratio between the dials and the racks 20 and 26, the ratio being such that when the rider traverses the slide rule from the left index to the right index thereof the dials move in relation to each other the distance of one scale division, as will be explained in the examples which follow.

During the course of a calculation, for example 2×3×3, we begin with the indices or 1 and 10 marks of the slide 12 corresponding to the indices of the stator 10 and the hairline 16 of the rider 14 over the left indices. The dial 74 is set with its arrow 18 of the DN scale matching the 0 of the RN-DZ scale on the dial 70. The first operation then is to move the rider until the hairline matches the 2 on the D scale of the slide rule. This results in rotation of the pinions 34 and 56 in the same direction (clockwise) and at the same speed with the pinion 56 rotating the elements 86, 58, 60, 62, 64, 48, 66, 68 and 70. The dial 70 turns counterclockwise, considering rotation from the front of the slide rule (or clockwise, considering it from the back, Fig. 3), a distance corresponding to the logarithm of 2. At the same time, the elements which are rotated by the pinion 34 are 32, 36, 38, 42, 44, 46, 52 and 54. The bevel gear 54 rotates counter-clockwise and in so doing it rotates the disk 76 also counter-clockwise but at half the speed of the bevel gear because at this time the disk is unlocked by the unlocking finger 90 being pressed downwardly. Consequently, the dial 74 remains stationary, due to its frictional engagement with the shoulder 95 of the shaft 40 under the action of the friction washer, and the arrow 18 thereby still indicates the 0 region of the RN-DZ scale.

The next step in the calculation is to move the slide 12 to the right until its left index is under the hairline 16, and this results in no movement of either the dial 70 or the dial 74, since the rack 26 of the slide now rotates the bevel gear 54 (this time clockwise) through the intermediate elements 34, 32, 36, 38, 42, 44, 46 and 52, and the disk 76 rotates at half the speed of the bevel gear with no movement being imparted to the dial 74.

The next step in the operation is to move the rider until the hairline is over 3 on the C scale, which moves the dial 70 again, as already explained in the first step of the operation, this time advancing it clockwise (from the back, Fig. 3) until the logarithm of 6 on the RN-DZ scale corresponds to the arrow 18 on the DN scale. The arrow 18 is still in the 0 region of the RN-DZ scale, as it does not reach the +1 region until the dial 70 has rotated the distance of one scale division which corresponds to the logarithm of 10 on the slide rule itself.

The hairline is now indicating an answer of 6 on the D scale. The next step of the calculation is to multiply the answer 6 by 3 (the third factor of our example) which is done by moving the left index of the slide under the hairline. This results in no movement of the dial 70 and no movement of the dial 74 in relation thereto. It is now desirable to move the rider still farther until the hairline assumes a position over 3 on the C scale, but since this is off scale it is now necessary, in order to arrive at the proper decimal point location, to lock the rider to the stator by pressing on the locking finger 92. This also locks the disk 76. Now by moving the slide 12 back to the left one full scale length, so that the right index thereof is under the hairline, the dial 74 is moved counter-clockwise (from the back—Fig. 3) one one full scale division, thus positioning the index 18 in the +1 region, at a position corresponding to the log of 60. In this way an answer falling beyond the right end of the slide rule is taken care of automatically as to Region Number by the dials 70 and 74.

It is the dial 74 which rotates counter-clockwise in this instance because of the disk 76 being locked, and the rack 26 through the intermediate elements, 34, 32, 36, 38, 44, 46 and 52 rotating the bevel gear 54 clockwise (from the back). The bevel gear 54 itself then rotates the bevel gear 72 and the dial 74 through the bevel pinions 78 in the opposite direction, and the same distance.

By releasing the rider by pressure on the unlocking finger 90 and moving the hairline over the 3 on the C scale, the result 18 of the calculation can be read on the D scale. As the rider is moved from 6 on the D scale to 18 on the D scale the dial 70 rotates counter-clockwise, thus causing the arrow 18 to move backwards to a position corresponding to the log of 18. In other words, the arrow 18 is still in the +1 region.

We can now place the decimal point by solving the formula $$DN = D - (F+Z) \text{ or } 3 - (3+0) = 0$$

and reading the digits or zeros in the answer on the RN-DZ scale (dial 70) opposite the Difference Number (0) on the DN scale (dial 74). This DZ number is +2 which indicates that there are two digits in the answer, or, in other words, that the answer is 18 and not 1.8 or 180.

In problems in division, the operations are reversed, as the slide rule usually runs off scale to the left. When the quotient falls beyond the left index of the D scale, the rider is moved to the right index of the C scale and then locked by pressing the finger 92. The slide is then propelled to the right one full scale length from index to index, which results in the dial 74 rotating a full division counter-clockwise (from the back).

It is believed that, from the foregoing explanation, the automatic operation of the dials 70 and 74 are obvious for those calculations wherein multiplication and division both are present. Whenever the slide is moved until one of its indices is under the hairline, and the next number in the calculation is beyond the end of the slide rule, it is only necessary to remember to lock the rider against movement by pressure on the finger 92 and move the slide a full scale length in the opposite direction so that said next number in the calculation is within the limits of the D scale. In multiplication, the next operation after unlocking the rider is always to move the rider to get the hairline to match said number so that the answer can be read or the calculation continued. In division, after the divisor is set under the hairline, the rider is moved to the right index of the C scale and the rider subsequently locked and the slider propelled to the right one full C scale length, after which the answer can be read on the D scale or the calculation continued.

In Figs. 5 and 6 a rotary slide rule is illustrated wherein the stator with the D scale thereon is indicated at 10$^a$ and the rotor with the C scale thereon at 12$^a$, the rotor corresponding to the slide in the first described rule. The stator 10$^a$ has the RN-DZ scales for first, one-half and one-third powers printed on the back thereof, and the dial for this scale is indicated as 70$^a$. The DN scale is printed on a dial 74$^a$ which is rotatably mounted by being secured against a shoulder 114 of a shaft 98 as by a screw 112. This shaft has a gear 100 mounted thereon, and meshing with a pinion 102 which is freely rotatable on a stud 104. The pinion 102 is integral with a gear 106 which meshes with a stationary gear 108, that is, the gear 108 is stationary with relation to the stator 10$^a$ by being integral with or secured to a hub 110 thereof. The stud 104 is carried by a transparent arm 14$^a$ corresponding to the rider in the slide rule and carrying a hairline 16$^a$ thereon. The arm 14$^a$ rotates around the hub 110 of the stator 10$^a$. The gearing may be enclosed in a housing 114 carried by the rider arm 14$^a$.

During calculations on the slide rule shown in Figs. 5 and 6 the rotor 12$^a$ and the rider arm 14$^a$ are alternatively moved, and during such movements of the rider arm the dial 74$^a$ is rotated with respect to the dial 70$^a$. This arrangement operates substantially the same as that disclosed in Figs. 3 and 4 for automatically locating the Region Number resulting from calculations on the slide rule without the complication of locking the rider when the answer goes off scale, as in a straight slide rule. In the rotary type the scale is continuous, and, accordingly, the gearing arrangement for automatically operating the dial 70$^a$ in relation to the dial 74$^a$ is very much simplified. When the rider is rotated a complete revolution the dial 70$^a$ has moved a complete scale division and the rider can go on and move an indefinite number of revolutions with the scale divisions adding up or subtracting to determine the Region Number and then the number of digits or zeros, as the case may be, for the answer, by solving the formula $$D_n - (F_n + Z_n) - [D_d - (F_d + Z_d)]$$

This arrangement is limited, of course, to a half revolution of the dial 70$^a$ in either the minus or the plus direction, and the divisions on the DN and RN-DZ scales can be made quite fine if desired for extended computations having a great number of factors.

From the foregoing specification it is believed obvious how the decimal point locator of Figs. 1, 1A, 2 and 2A is operable for manually determining the Region Number and thereby aid in location of the decimal point and how this is automatically done in the forms of invention shown in Figs. 3 and 4 and in Figs. 5 and 6. The factors, digits and zeros in the numerator and the denominator of course must be taken into consideration and calculated in connection with each problem worked out on the slide rule, but this is a relatively simple operation and derives its simplicity from a formula which has been reduced to the least number of elements. This formula:

$$DN = D_n - (F_n + Z_n) - [D_d - (F_d + Z_d)]$$

is one in which $D_n$ and $D_d$ designate for the answer the total number of digits to the left of the decimal point for those numbers greater than one in the numerator and denominator, respectively, $F_n$ and $F_d$ designate the total number of factors in the numerator and denominator, respectively, and $Z_n$ and $Z_d$ designate the total number of zeros to the right of the decimal point. This formula omits from consideration that 1 must be subtracted from the formula to get the proper result, but this is taken care of in all decimal point calculations by placing the arrow 18 over −1 instead of over 0 on the DN scale.

Some changes may be made in the construction and arrangement of the parts of my calculator without departing from the real spirit and purpose of my invention, and it is my intention to cover by my claims any modified forms of structure or use of mechanical equivalents which may be reasonably included within their scope.

I claim as my invention:

1. In a combined slide rule and decimal point locator having the usual logarithmic scales for calculations involving multiplication and division, means associated therewith for indicating region numbers, with all readings within the length of the stator scale of said slide rule considered as falling within one region bearing a designating region number and off scale readings to the right or left of said stator scale considered as falling within other regions having other designating region numbers each representing an additional stator scale length, said means having a pair of scales, one a difference number scale graduated in units that represent a difference number which is the difference between the digits minus the factors plus the zeros in the numerator and the digits minus the factors plus the zeros in the denominator of a computation, and the other a region number-digit-zero scale graduated in units representing said region numbers, said pair of scales being movable relative to each other and adapted for the positioning of the difference number scale in relation to the region number-digit-zero scale, the number of digits or zeros in the answer for said computation being on the region number-digit-zero scale opposite said the difference number on the difference number scale.

2. In a combined slide rule and decimal point locator having the usual logarithmic scales, means associated therewith for indicating region numbers, with all readings within the length of the stator scale of said slide rule considered as falling within one region bearing a designating region number and off scale readings to the right or left of said stator scale considered as falling within other regions having other designating region numbers each representing an additional stator scale length, said means having a pair of scales, one a difference number scale graduated in units that represent a difference number which is the difference between the digits minus the factors plus the zeros in the numerator and the digits minus the factors plus the zeros in the denominator of a computation, and the other a region number-digit-zero scale graduated in units representing said region numbers, said pair of scales being movable relative to each other and adapted for the positioning of the difference number scale in relation to the region number-digit-zero scale, the number of digits or zeros in the answer for said computation being on the region number-digit-zero scale opposite said the difference number on the difference number scale, said region number-digit-zero scale having readings for both numbers and roots of numbers.

3. A slide rule and decimal point locator having logarithmic scales for performing computations, said slide rule having relatively movable difference number and region number-digit-zero scales for cooperation with each other, said difference number scale being graduated in units that represent digits, factors and zeros in the numerator and denominator of a computation according to the formula $$DN = D_n - (F_n + Z_n) - [D_d - (F_d + Z_d)]$$

wherein $D_n$ and $D_d$ designate for the answer the total number of digits to the left of the decimal point for those numbers greater than 1 in the numerator and denominator, respectively, $F_n$ and $F_d$ designate the total number of factors in the numerator and denominator, respectively, and $Z_n$ and $Z_d$ designate the total number of zeros to the right of the decimal point in those numbers less than 1, said region number-digit-zero scale being graduated in units representing region numbers with all readings within the length of the stator scale of said slide rule considered as falling within one region bearing a designating region number and off scale readings to the right and left of said stator scale considered as falling within other regions having other designating region numbers each representing an additional stator scale length, and with −1 of the difference number scale opposite the region number on the region number-digit-zero scale indicating under the determined difference number on the difference number scale the number of digits or zeros in the answer on the region number-digit-zero scale.

4. A decimal point locator combined with a slide rule comprising means for indicating region numbers corresponding to each scale length off scale reading beyond the end of the slide rule and with all readings within the length of the stator scale considered as falling within one region bearing a designating region number and off scale readings to the right or left of said stator scale considered as falling within other regions bearing other region designating numbers each of which represents an additional stator scale length, and a pair of decimal point determining scales movable relative to each other, one of said last scales being graduated in units that represent difference numbers and the other being graduated for said region numbers and for digits and zeros, −1 of the difference number scale when opposite the region number on the region number-digit-zero scale, which region number was determined by manipulation of the slide rule, placing opposite the difference number on the difference number scale the number of digits or zeros in the answer on the region number-digit-zero scale said difference number being determined by the formula $$D_n - (F_n + Z_n) - [D_d - (F_d + Z_d)]$$

wherein $D_n$ and $D_d$ designate for the answer the total number of digits to the left of the decimal point for those numbers greater than 1 in the numerator and denominator respectively, $F_n$ and $F_d$ designate the total number of factors in the numerator and denominator respectively, and $Z_n$ and $Z_d$ designate the total number of zeros to the right of the decimal point in those numbers less than 1.

5. In a slide rule and decimal point locator, a stator and a slide having logarithmetic scales, at least one of said scales being repeated a number of times whereby a computation may be performed on the slide rule wherein the answer extends beyond the first scale used to thereby indicate an off scale region, region numbers on said slide rule to indicate both on and off scale regions, a difference number scale on one element of the slide rule and a region number-digit-zero scale on the other element of the slide rule for cooperation with each other to determine the number of digits or zeros in the answer to the computation by first determining a difference number according to the formula $$D_n - (F_n + Z_n) - [D_d - (F_d + Z_d)]$$

wherein $D_n$ and $D_d$ designate for the answer the total number of digits to the left of the decimal point in the numerator and denominator, respectively, $F_n$ and $F_d$ designate the total number of factors in the numerator and denominator, respectively, and $Z_n$ and $Z_d$ designate the total number of zeros to the right of the decimal point, and then placing −1 of the difference number scale opposite the region number on the region number-digit-zero scale, with all readings within the bounds of said first scale falling within one region bearing a designating region number and off scale readings to the right or left of said first scale considered as falling within other regions having other designating region numbers each representing an additional scale length, whereby under the determined difference number on the difference number scale, the number of digits or zeros in the answer is found on the region number-digit-zero scale.

6. In a slide rule and decimal point locator, a stator and a slide having the usual logarithmic scales, at least one of said scales being repeated a number of times and said slide rule having a region number for each of said scales whereby a computation may be performed on said slide rule wherein the answer indicates a region number, a difference number scale on one element of the slide rule and a region number and digit-zero scale on the other element of the slide rule for cooperation with each other to determine the number of digits or zeros in the answer to said computation by first determining a difference number according to digits minus factors plus zeros in said computation, whereby under said determined difference number, the number of digits or zeros in the answer may be read on the digit-zero scale.

7. In a combined slide rule and decimal point locator, a stator and a slide having repeated logarithmic scales and a rider for calculations involving multiplication and division, means associated therewith for indicating a region number corresponding to said repeated logarithmetic scales, and a pair of scales, one a difference number scale and the other a region number-digit-zero scale, movable relative to each other and adapted for positioning of −1 of the difference number scale over the corresponding region number on the region number scale, then determining the number of digits or zeros in the answer for the computation by determining a difference number depending upon digits minus factors plus zeros in the numerator and denominator of a computation, those of the denominator being subtracted from those of the numerator to determine said difference number, and reading the digits or zeros on the digit-zero scale opposite the determined difference number after said −1 of said difference number scale has been positioned opposite the determined difference number.

8. In a slide rule having a stator, a slide and a rider, a decimal point locator mounted on said rider and comprising a pair of dials, one graduated for zero, plus and minus difference numbers and the other for region numbers and digits or zeros in the answer, said dials being geared to said stator and said slide and thereby relatively rotatable during movement of said slide and said rider for determining a region number indicating where successive answers fall both on and beyond the stator scale of the slide rule, said decimal point locator having means to lock the same for causing relative rotation of said dials when moving said slide whereby the final region number reading may be taken from the region number-digit-zero scale at the −1 position on the difference number scale and opposite the difference number on the difference number scale the digits or zeros in the answer may be read on the region number-digit-zero scale after said difference number has been determined by the formula $$D_n - (F_n + Z_n) - [D_d - (F_d + Z_d)]$$

wherein $D_n$ and $D_d$ designate for the answer the total number of digits to the left of the decimal point for those numbers greater than 1 in the numerator and denominator respectively, $F_n$ and $F_d$ designate the total number of factors in the numerator and denominator respectively, and $Z_n$ and $Z_d$ designate the total number of zeros to the right of the decimal point for those numbers less than 1.

9. In a slide rule having a stator, a slide and a rider, a decimal point locator mounted on said rider and comprising a pair of dials, one graduated for zero, plus and minus difference numbers and the other for region numbers and digits or zeros in the answer, said dials being geared to said stator and said slide and thereby relatively rotatable during movement of said slide and said rider for determining a region number indicating where successive answers fall both on and beyond the stator scale of the slide rule, said decimal point locator having means to lock the same for causing relative rotation of said dials when said stator and said slide are relatively shifted, whereby the final region number reading may be taken from the region number scale at the −1 position on the difference number scale, and opposite the difference number on the difference number scale the digits or zeros in the answer may be read on the digit-zero scale after determination of said difference number depending on digits minus factors plus zeros in the computation.

10. In a slide rule having a stator, a slide and a rider, a decimal point locator mounted on said rider and comprising a pair of relatively rotatable dials geared to said stator and said slide for indicating a region number for an on-scale region and other region numbers for off-scale regions beyond the ends of the stator scale of the slide rule wherein successive answers in the computation fall either on-scale or off-scale, said decimal point locator having differential gearing, and means to lock the same for causing relative rotation of said dials when the computation goes off scale and said slide is shifted whereby the final region number reading may be taken from the region number scale at a predetermined position on the difference number scale and opposite the difference number on the difference number scale the digits or zeros in the answer may be read on the digit-zero scale, said difference number being determined by the number of digits, minus the number of factors plus the number of zeros of the numerator and denominator of the computation when those of the denominator are subtracted from those of the numerator.

11. In a slide rule of the character disclosed, a stator, a slide, a rider, and a decimal point locator mounted on said rider and comprising a pair of dials, one having a difference number scale thereon and the other having a region number-digit-zero scale thereon for cooperation with said difference number scale, the region numbers of said region number-digit-zero scale referring to readings within one region represented by the stator scale and other regions, each a stator scale in length when progressive manipulations of the rule indicate an answer beyond said stator scale and require a reversal of the slide to return the answer to an on-scale position, one of said dials being geared to said stator and the other geared to said slide through the medium of differential gearing, means for locking said gearing during slide shifts necessary when the reading goes off scale whereby to operate said difference number and region number-digit-zero scales in proper relation to each other during calculations, with the final position of one dial relative to the other indicating the region number on the region number scale opposite −1 on the difference number scale, and opposite the difference number for the computation on the difference number scale may be found the number of digits or zeros in the answer, the difference number being determined by the formula $$D_n - (F_n + Z_n) - [D_d - (F_d + Z_d)]$$

wherein $D_n$ and $D_d$ designate for the answer the total number of digits to the left of the decimal point for those numbers greater than 1 in the numerator and denominator respectively, $F_n$ and $F_d$ designate the total number of factors in the numerator and denominator respectively, and $Z_n$ and $Z_d$ designate the total number of zeros to the right of the decimal point.

12. In a slide rule of the character disclosed, a stator having a rack, a slide having a rack, a rider, and a decimal point locator mounted on said rider and comprising a pair of dials, one of said dials being geared to the rack on said stator and the other geared to the rack on said slide through the medium of differential gearing, means for locking said differential gearing against rotation and said rider against movement relative to said stator during slide shifts necessary when the reading goes beyond the stator scale, the final position of one dial relative to the other indicating regions used in determining the position of the decimal point, one of said regions being the stator scale itself and others of said regions being one or more stator scale lengths beyond said stator scale.

13. In a rotary slide rule and decimal point locator, a stator and a rotor having the usual logarithmic scales, a rotatable rider arm having a hairline for cooperating with the stator and rotor scales, a pair of dials, one graduated for reading the region numbers and digits or zeros and the other cooperating therewith and graduated for reading difference numbers, one of said dials being carried by said stator, said stator and the other of said dials being geared together, the gearing including intermediate gears carried by said rider arm whereby to operate said dials in relation to each other by manipulation of the rider arm relative to the stator whereby a region number corresponding to a computation on the slide rule may be read on the region number-digit-zero scale opposite −1 on the difference number scale, and the number of digits or zeros in the answer can then be read on the digit-zero scale opposite the difference number, said difference number being determined by the formula $$D_n - (F_n + Z_n) - [D_d - (F_d + Z_d)]$$

wherein $D_n$ and $D_d$ designate for the answer the total number of digits to the left of the decimal point for those numbers greater than 1 in the numerator and denominator respectively, $F_n$ and $F_d$ designate the total number of factors in the numerator and denominator respectively, and $Z_n$ and $Z_d$ designate the total number of zeros to the right of the decimal point.

14. In a rotary slide rule and decimal point locator, a stator and a rotor having the usual logarithmic scales, a rotatable rider arm, a pair of dials, one graduated for reading region numbers and digits or zeros and the other cooperating therewith and graduated for reading difference numbers, one of said dials being carried by said stator, said stator and the other of said dials being geared together, the gearing including intermediate gears carried by said rider arm whereby to operate said dials in relation to each other by rotation of the rider arm whereby a region number corresponding to a computation on the slide rule may be read on the region number-digit-zero scale in relation to the difference number scale, and the number of digits or zeros in the answer can then be read on the region number-digit-zero scale opposite the difference number found on the difference number scale, said difference number being determined by the number of digits minus the number of factors plus the number of zeros in the computation.

15. In a rotary slide rule and decimal point locator, a stator and a rotor having the usual logarithmic scales, a rider having a hairline for cooperating with the stator and rotor scales, a pair of dials, one of said dials being carried by said stator, said stator and the other of said dials being geared together, the gearing including intermediate gears carried by said rider arm whereby to operate said dials in relation to each other by manipulation of the rider relative to the stator whereby a region number corresponding to a computation on the slide rule is indicated on said dials to aid in determining the number of digits or zeros in the answer to a computation on the slide rule, said region number being one of a series of region numbers one of which refers to the stator scale on the rule and the others of which refer to repeated extensions of said scale either to the left or to the right thereof.

ARTHUR F. ECKEL.

REFERENCES CITED

The following references are of record in the file of this patent:

UNITED STATES PATENTS

| Number | Name | Date |
|---|---|---|
| 2,117,413 | Gilmore | May 17, 1938 |
| 2,177,176 | Gilmore | Oct. 24, 1939 |
| 2,328,966 | Dickson | Sept. 7, 1943 |
| 2,363,642 | Cherney | Nov. 28, 1944 |